Patented Oct. 1, 1929

1,729,993

UNITED STATES PATENT OFFICE

LAURIE LORNE BURGESS, OF CAMBRIDGE, MASSACHUSETTS, ASSIGNOR TO PLASTIC, INC., OF KEENE, NEW HAMPSHIRE, A CORPORATION OF NEW HAMPSHIRE

PROCESS OF PRODUCING ALGINIC ACID COMPOUNDS AND PRODUCT THEREOF

No Drawing.  Application filed July 14, 1928. Serial No. 292,923.

My invention relates particularly to the interaction of alginic acid with hydrocarbons of various kinds so as to obtain desirable products, including as well the compounds formed as a result thereof.

The object of my invention is to obtain products by the interaction of hydrocarbons with alginic acid or compositions containing the same. The object of my invention is, furthermore, to obtain, also, products of a soluble, as well as an insoluble character containing such compounds. Further objects of my invention will appear from the detailed description of the same hereinafter.

While my invention is capable of being carried out in many different ways, for the purpose of illustration I shall describe only certain ways of carrying out the same hereinafter.

In general, my invention may be carried out by heating alginic acid, or compositions containing the same, dissolved in an alkaline reagent, such as ammonium hydrate, or soda ash, or sodium hydroxide, etc. with hydrocarbons dissolved in a suitable solvent, such, for example, as carbon tetrachloride. During the heating it is best, but not essential, to agitate the charge during the reaction period. After the interaction of the constituents, precipitation may be effected therein by adding a mineral acid, such as hydrochloric or sulphuric acid, after which the precipitate may be filtered, washed and dried. This dried precipitate may be then extracted with carbon tetrachloride, thus separating the material into two portions, that is to say, the portion which dissolves in carbon tetrachloride and the residue. The portion which has dissolved in the carbon tetrachloride may be separated from the latter by distillation, thus obtaining a product which is similar to the hydrocarbon in many respects but has, also, some distinctly new properties. For instance, when the hydrocarbon used as a reacting material is paraffin wax the product will penetrate coarse materials, such as paper, fabric, etc., as by rubbing it over the surfaces thereof, thus imparting to them a high degree of water resistance. The product, furthermore, may be pulled and kneaded in very much the same manner as taffy when warmed by the hands. Also, it may be recrystallized from acetone, thus yielding flaky crystals. The product also may be reduced to a powder by gently rubbing the same in a mortar. However, the percentage of carbon and hydrocarbon present is below 100%, showing that the material is not a hydrocarbon.

Again, when a finely divided metal, such as copper, zinc, etc., is added to the original mixture at the time of the reaction between the hydrocarbon and the alginic acid, the mass precipitates of its own accord after the reaction has proceeded for several hours. The resulting mass may then be filtered off, washed and dried, and then extracted with carbon tetrachloride.

For example, in carrying out my invention I may proceed as follows:

Example 1

An alginic acid jelly may be prepared by breaking down a sea growth containing alginic acid, as, for example, Laminaria, in the presence of an alkali, such, for example, as sodium hydroxide, soda ash. This may be accomplished by treating 10 kilograms of the Laminaria, which may or may not have been previously dried, with 0.2 kilograms of soda ash in the presence of 15 liters of water. This action is allowed to continue for a period of 5 hours. The algulose which has not become dissolved may then be removed by decantation or otherwise. The liquid thus obtained is then precipitated by the addition of 400 cc. of a dilute mineral acid (N/1), such, for example, as hydrochloric acid or sulphuric acid. This produces as a precipitate an alginic acid jelly containing in the jelly a considerable amount of water.

285 grams of the alginic acid jelly containing 15 grams of dry solid are dissolved in 10 cc. of concentrated ammonia and 200 cc. of water. 25 grams of paraffin wax and 50 cc. of carbon tetrachloride are then added, the paraffin having been previously dissolved in the carbon tetrachloride. The solid mass is then heated in a flask having a reflux condenser attached thereto. The flask is agitated for approximately 10 hours while maintaining a temperature of 80 to 90° C. The contents are then precipitated by adding 60 cc. of a 10% solution of hydrochloric acid and the precipitate is filtered, washed and dried. The cake thus obtained is broken up and extracted with carbon tetrachloride in a soxhlet extractor for a period of from 2 to 3 hours. The solution thus obtained is separated by distilling off the carbon tetrachloride therefrom.

*Example 2*

285 grams of the alginic acid jelly obtained as above described, and containing 15 grams of dry solid, is dissolved in 10 cc. of concentrated ammonia and 250 cc. of water. 15 grams of paraffin wax dissolved in 25 cc. of carbon tetrachloride are then added, as well as 5 grams of zinc dust. The charge is then heated at 80 to 90° C. in a flask provided with an agitator and a reflux condenser, for approximately 16 hours. The product is then filtered off, washed and dried. The product thus obtained may be extracted with carbon tetrachloride and the solid obtained from the solution by distilling off the carbon tetrachloride exactly as above described.

Instead of starting with the alginic acid jelly, as described in the above examples, I may start directly with the kelp itself, as set forth in the following example.

*Example 3*

300 grams of kelp (Laminaria) containing 30 grams of solid is dissolved in 10 cc. of ammonia and 300 cc. of water. 15 grams of paraffin wax, dissolved in 40 cc. of carbon tetrachloride are then added as well as 3 grams of copper powder. The charge is then heated at 80°–90° C. in a flask provided with an agitator and a reflux condenser, for approximately 15 hours. The product is then filtered off, washed and dried. The product thus obtained may be extracted with carbon tetrachloride and the solid obtained from the solution by distilling off the carbon tetrachloride exactly as above described.

It will be understood that the conditions of operation, and the proportions above referred to, may be varied within wide limits. Also, in the case of the paraffin wax, other hydrocarbons may be substituted therefor, as, for example, vaseline, so-called heavy hydrocarbons, etc.

Also, in the place of the Laminaria I may use any other sea growth containing alginic acid. Also, in place of the ammonia or ammonium hydrate I may use other alkaline reagents such as soda ash, sodium hydroxide, potassium hydroxide, etc.

In the above products there are, evidently, found to be one or more compounds resulting from a reaction between the alginic acid and the hydrocarbon. In the case of paraffin wax there are present, undoubtedly, a number of hydrocarbons, and it may be, also, that the alginic acid itself is a mixture of acids. However, it has been found that the product obtained as above, by extraction of the precipitated material and then distilling off the carbon tetrachloride, leaves a crystalline material which is of an apparently constant character, as shown by recrystallization, and the composition thereof may be represented by the following empirical formula:

$$C_{48}H_{91}O_2$$

While I have described my invention above in detail I wish it to be understood that many changes may be made therein without departing from the spirit of the same.

I claim:

1. The process which comprises reacting upon a hydrocarbon with alginic acid.

2. The process which comprises reacting upon paraffin wax with alginic acid.

3. The process which comprises reacting upon paraffin wax in the presence of a solvent with alginic acid.

4. The process which comprises reacting upon paraffin wax in the presence of carbon tetrachloride with alginic acid.

5. The process which comprises reacting upon a hydrocarbon with alginic acid, precipitating the product by adding a mineral acid, extracting the precipitated product with a solvent, and distilling off the solvent.

6. The process which comprises reacting upon paraffin wax with alginic acid, precipitating the product by adding a mineral acid, extracting the precipitated product with a solvent, and distilling off the solvent.

7. The process which comprises reacting upon paraffin wax in the presence of a solvent with alginic acid, precipitating the product by adding a mineral acid, extracting the precipitated product with a solvent, and distilling off the solvent.

8. The process which comprises reacting upon paraffin wax in the presence of carbon tetrachloride with alginic acid, precipitating the product by adding a mineral acid, extracting the precipitated product with a solvent, and distilling off the solvent.

9. The process which comprises reacting upon a hydrocarbon with alginic acid, precipitating the product by adding hydrochloric acid, extracting the precipitated product with carbon tetrachloride, and distilling off the carbon tetrachloride.

10. The process which comprises reacting upon paraffin wax with alginic acid, precipitating the product by adding hydrochloric acid, extracting the precipitated product with carbon tetrachloride, and distilling off the carbon tetrachloride.

11. The process which comprises reacting upon paraffin wax in the presence of a solvent with alginic acid, precipitating the product by adding hydrochloric acid, extracting the precipitated product with carbon tetrachloride, and distilling off the carbon tetrachloride.

12. The process which comprises reacting upon paraffin wax in the presence of carbon tetrachloride with alginic acid, precipitating the product by adding hydrochloric acid, extracting the precipitated product with carbon tetrachloride, and distilling off the carbon tetrachloride.

13. A product comprising a reaction product of alginic acid and a hydrocarbon.

14. A product comprising a reaction product of alginic acid and paraffin wax.

15. A product comprising a reaction product of alginic acid and a hydrocarbon, the same being a crystalline material soluble in carbon tetrachloride.

16. A product comprising a reaction product of alginic acid and paraffin wax, the same being a crystalline material soluble in carbon tetrachloride.

In testimony that I claim the foregoing, I have hereunto set my hand this 21st day of June, 1928.

LAURIE L. BURGESS.